United States Patent
Rosenthol et al.

(10) Patent No.: US 12,088,738 B2
(45) Date of Patent: Sep. 10, 2024

(54) CUSTOM RULES FOR GLOBAL CERTIFICATE ISSUANCE

(71) Applicant: Amazon Technologies, Inc., Seattle, WA (US)

(72) Inventors: Josh Rosenthol, Centreville, VA (US); Param Sharma, Haymarket, VA (US); Kyle Benjamin Schultheiss, Centreville, VA (US); Marcel Andrew Levy, Seattle, WA (US); Todd Cignetti, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 329 days.

(21) Appl. No.: 17/541,998

(22) Filed: Dec. 3, 2021

(65) Prior Publication Data
US 2023/0179429 A1 Jun. 8, 2023

(51) Int. Cl.
| | | |
|---|---|---|
| G06F 21/00 | (2013.01) | |
| H04L 9/08 | (2006.01) | |
| H04L 9/32 | (2006.01) | |
| H04L 9/40 | (2022.01) | |

(52) U.S. Cl.
CPC .......... *H04L 9/3268* (2013.01); *H04L 9/0825* (2013.01); *H04L 9/3213* (2013.01); *H04L 63/102* (2013.01); *H04L 63/20* (2013.01)

(58) Field of Classification Search
CPC ... H04L 9/3268; H04L 9/0825; H04L 9/3213; H04L 63/102; H04L 63/20; H04L 9/321
See application file for complete search history.

(56) References Cited

U.S. PATENT DOCUMENTS

| | | | |
|---|---|---|---|
| 6,108,788 A | * | 8/2000 | Moses ................... G06F 21/602 713/155 |
| 7,694,142 B2 | | 4/2010 | Saw et al. |
| 8,327,128 B1 | | 12/2012 | Prince et al. |
| 9,660,817 B2 | | 5/2017 | Saboori et al. |

(Continued)

OTHER PUBLICATIONS

"AWS Certificate Manager", Amazon Web Services, Dec. 8, 2015, pp. 1-82, XP093023107.

(Continued)

*Primary Examiner* — Michael M Lee
(74) *Attorney, Agent, or Firm* — NICHOLSON DE VOS WEBSTER & ELLIOTT LLP

(57) ABSTRACT

Techniques are described for enabling users of a certificate management service to create certificate issuance policies that can be applied to certificate issuance requests across both public and private certificate authorities (CAs) and other certificate-related services. According to embodiments described herein, a certificate issuance policy includes one or more certificate issuance rules to be applied to requests associated with one or more specified user accounts or roles for certificate-related resources (e.g., public certificates, private certificates, etc.). The application of a certificate issuance rule can be conditioned on a particular request context (e.g., based on a user account or role associated with a request, a type of certificate requested, a subject name identified in the request, etc.) and can specify a wide range of actions to be performed on requests matching a rule (e.g., allowing or denying a request, modifying one or more parameters of the request, etc.).

20 Claims, 9 Drawing Sheets

(56) References Cited

U.S. PATENT DOCUMENTS

| | | | |
|---|---|---|---|
| 2002/0073311 A1* | 6/2002 | Futamura | H04L 9/007 |
| | | | 713/157 |
| 2004/0177250 A1* | 9/2004 | Westphal | H04L 9/3263 |
| | | | 713/156 |
| 2007/0118875 A1* | 5/2007 | Chow | H04L 63/0846 |
| | | | 726/2 |
| 2011/0113239 A1* | 5/2011 | Fu | H04L 63/0823 |
| | | | 713/156 |
| 2011/0154024 A1 | 6/2011 | Ignaci et al. | |
| 2011/0219067 A1 | 9/2011 | Bernosky et al. | |
| 2014/0281558 A1* | 9/2014 | Dixon | H04L 63/061 |
| | | | 713/176 |
| 2015/0222604 A1 | 8/2015 | Ylonen | |
| 2019/0245700 A1 | 8/2019 | Dobre et al. | |
| 2020/0052908 A1* | 2/2020 | Thitron | H04L 63/20 |
| 2021/0352472 A1 | 11/2021 | Ganesan et al. | |
| 2023/0032867 A1* | 2/2023 | Peddada | H04L 9/3268 |

OTHER PUBLICATIONS

"AWS Identity and Access Management—part 1", Amazon Web Services, Nov. 27, 2021, pp. 1-878, XP093023105.

"AWS Identity and Access Management—part 2", Amazon Web Services, Nov. 27, 2021, pp. 1-878, XP093023128.

Anonymous: "How CA Certificates Work: Public Key; Security Services", Mar. 28, 2002, XP055088416.

International Search Report and Written Opinion, PCT App. No. PCT/US2022/079150, Feb. 23, 2023, 10 pages.

International Search Report and Written Opinion, PCT App. No. PCT/US2023/015214, Jun. 1, 2023, 10 pages.

Non-Final Office Action, U.S. Appl. No. 17/700,281, Mar. 20, 2024, 12 pages.

* cited by examiner

CUSTOM RULES FOR GLOBAL CERTIFICATE ISSUANCE

BACKGROUND

Asymmetric cryptography systems use pairs of keys, including public keys and private keys, to encrypt and decrypt data. For example, a public key infrastructure (PKI) uses pairs of public and private keys to facilitate secure electronic communication. Public keys can be associated with digital certificates that certify the owner of a given public key. The digital certificates are created and signed by a public or private certificate authority which acts as a trusted third party. Various digital certificates can be used, e.g., to create secure connections over a network, such as the Internet. For example, Hypertext Transfer Protocol Secure (HTTPS) uses digital certificates to establish secure connections using Transport Layer Security (TLS).

BRIEF DESCRIPTION OF DRAWINGS

Various embodiments in accordance with the present disclosure will be described with reference to the drawings, in which.

DETAILED DESCRIPTION

Figure 1:
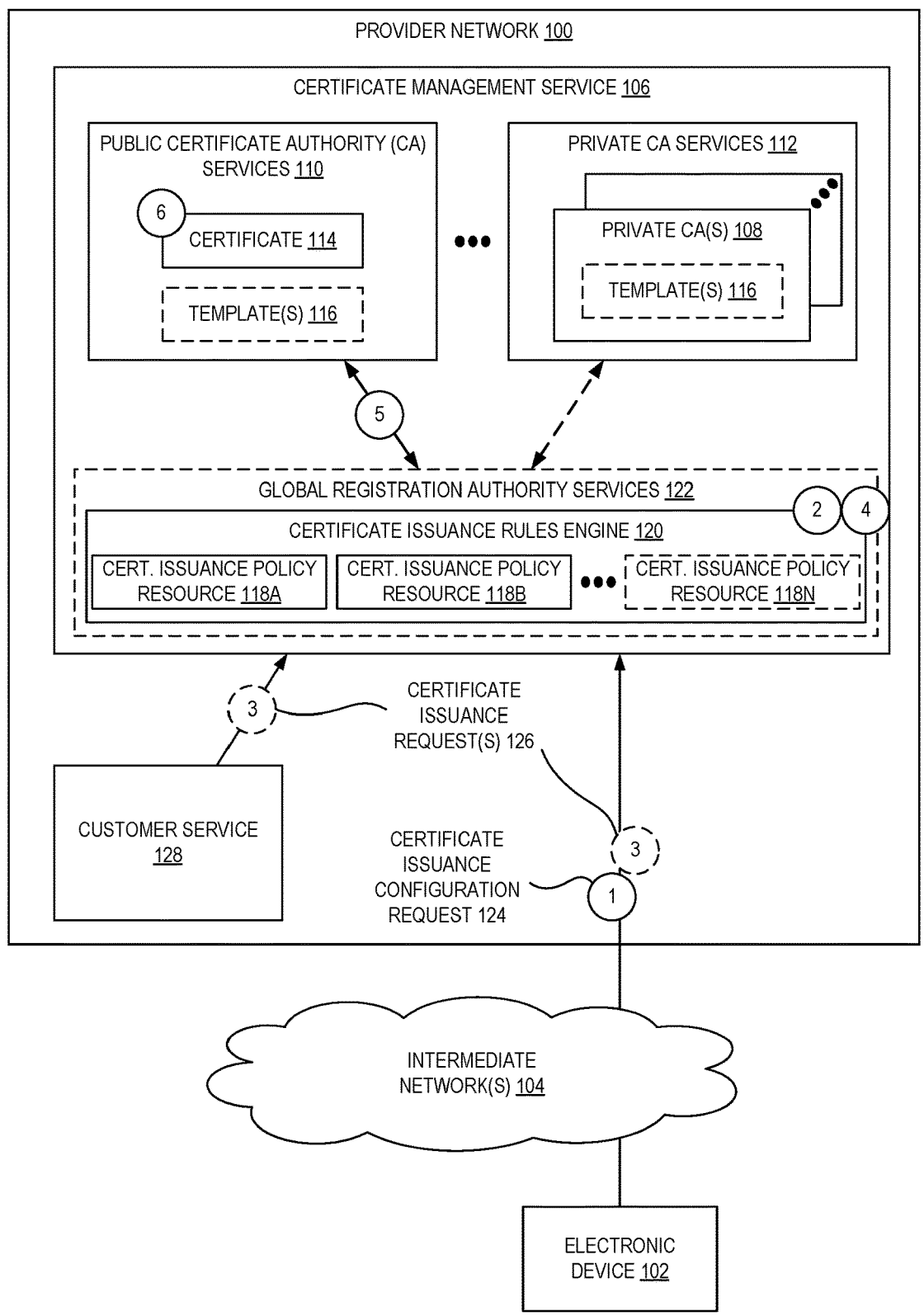
FIG. 1 is a diagram illustrating an environment for enabling users to configure and use certificate issuance policies according to some embodiments.

The present disclosure relates to methods, apparatus, systems, and non-transitory computer-readable storage media for enabling users of a certificate management service to create certificate issuance policies that can be applied to certificate issuance requests across both public and private certificate authorities (CAs) and other certificate-related services. According to embodiments described herein, a certificate issuance policy includes one or more certificate issuance rules to be applied to requests associated with one or more specified user accounts or roles for certificate-related resources (e.g., public certificates, private certificates, etc.). The application of a certificate issuance rule can be conditioned on a particular request context (e.g., based on a user account or role associated with a request, a type of certificate requested, a subject name identified in the request, etc.) and can specify a wide range of actions to be performed on requests matching a rule (e.g., allowing or denying a request, modifying one or more parameters of the request, etc.).

Today, users typically control certificate issuance within an organization using certificate templates or CA-specific rules. A template, for example, defines the attributes and ordering of attributes to be included in a digital certificate, such as a domain name, issue date, expiry date, public key, digital signature to be provided by the CA, etc. With CA-specific rules, users apply rules to a specific issuing CA without the ability for users to deviate from those rules. However, many CA administrators and other users desire the ability to manage the issuance of certificates from a range of CAs and to control the details of the issued certificated based on the context of a request such as, e.g., a user or role requesting a certificate, a type of certificate being requested, and the like.

To address these challenges, among others, techniques are described herein for providing a certificate issuance rules engine that enables users to configure certificate issuance policies and associated rules that can be applied across both public and private CAs and to particular users or user groups. Examples of the types of rules that can be configured as part of a certificate issuance policy include, but are not limited to, rules defining what domains certificates can be issued against, whether domain wildcards can be used, certificate validity periods, cryptographic key types and sizes, certificate tagging conventions, one or more fields to be completed by the certificate issuance rule, a rate at which the user account or role is requesting certificates, a volume of certificates requested by the user account or role, or a time of day, and the like. Among other benefits, the described certificate issuance rules engine enables the efficient management of certificate issuance across users' organizations, thereby providing for better security of services protected by the resulting issued certificates.

FIG. 1 is a diagram illustrating an environment for enabling users to configure certificate issuance policy resources according to some embodiments. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use.

Users (e.g., using an electronic device 102) can interact with a provider network 100 across one or more intermediate networks 104 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

For example, in various embodiments, a "serverless" function can include code provided by a user or other entity—such as the provider network itself—that can be executed on demand. Serverless functions can be maintained within a provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources can be maintained in a "ready" state (e.g., having a pre-initialized runtime environment configured to execute the serverless functions), allowing the serverless functions to be executed in near real-time.

As discussed, embodiments include a certificate management service 106 (or more broadly any type of PKI service or services) which users can use to create and manage certificate-related resources. The certificate management service 106 provides numerous features related to creating, storing, and renewing public and private certificates (e.g., SSL/TLS X.509 certificates) and keys used to protect users' websites and applications. The certificates created by the certificate management service 106 can secure singular domain names, multiple specific domain names, wildcard domains, or combinations of these. For example, wildcard certificates can protect an unlimited number of subdomains. Users can also export certificates signed by a private certificate authority (e.g., private CAs 108) managed by the certificate management service 106 for use anywhere in a user's internal PKI.

As indicated above, a SSL/TLS certificate allows web browsers and other applications to identify and establish encrypted network connections to web sites using the SSL/TLS protocol. Certificates are used within a cryptographic system knows as a public key infrastructure (PKI). PKI provides a way for one party to establish the identity of another party using certificates if they both trust a third-party, where the third-party is known as a certificate authority.

In some embodiments, a certificate management service 106 offers at least two different options for users desiring to deploy managed certificate-related resources. For example, the certificate management service 106 can provide public certificate management services 110 for users who need a secure web presence using TLS. In some embodiments, certificate-related resources created by the certificate management service 106 can be deployed to user resources via other services provided by the cloud provider (e.g., via a load balancing service, a content delivery network (CDN) service, an API gateway service, or other service where users may have deployed endpoint resources) or otherwise returned to a requesting user. The certificate management service 106 can also provide features enabling the automatic renewal of expiring certificates.

In some embodiments, a certificate management service 106 also provides private certificate authority services 112. The private certificate authority services, for example, can be used for private use within an organization. In establishing a secure encrypted communications channel, each endpoint uses a certificate and cryptographic techniques to prove its identity to the other endpoint. Internal API endpoints, web servers, VPN users, IoT devices, and many other applications use private certificates to establish encrypted communication channels that are necessary for their secure operation. Users can create their own certificate authority (CA) hierarchy and issue certificates with it for authenticating users, computers, applications, services, and other devices.

In some embodiments, the certificate-related resources managed by a certificate management service 106 are associated with a number of characteristics. For example, in some embodiments, certificates issued by the certificate management service 106 (e.g., a certificate 114) are domain validated. The subject field of a certificate issued by the certificate management service 106 identifies a domain name thus, when a user requests a certificate, the user validates ownership or control of all the domains specified in a request. The ownership or control of the specified domain names can be validated by using email, DNS, or other methods supported by the certificate management service 106.

In some embodiments, certificates issued by the certificate management service 106 may be associated with a defined validity period (e.g., 13 months, or any other period of time). The certificate management service 106 can also manage the process of renewing certificates and provisioning the certificates after they are renewed. In some embodiments, the certificates issued by the certificate management service 106 are trusted by major browsers (Google Chrome, Microsoft Internet Explorer and Microsoft Edge, Mozilla Firefox, etc.) and operating systems.

In some embodiments, each certificate management service 106 certificate includes at least one fully qualified domain name (FQDN) and users can add additional names if desired. For example, a user creating a certificate for www.example.com can also add the name www.example.net if users reach the site using either name. The certificate management service 106 also allows users to use an asterisk (*) in the domain name to create a certificate containing a wildcard name that can protect several sites in the same domain. For example. *.example.com protects www.example.com and images.example.com. In some embodiments, a certificate also specifies an algorithm and key size. The certificate management service 106 may, for example support several public key algorithms including, but not limited to: 2048-bit RSA, 4096-bit RSA, Elliptic Prime Curve 256 bit, Elliptic Prime Curve 384 bit, etc. Certificates can be associated with other parameters as described herein.

As indicated, users typically can control some aspects of certificate issuance using certificate templates (e.g., templates 116) or CA-specific rules. A template, for example, defines the attributes and ordering of attributes to be included in a digital certificate, such as a domain name, issue date, expiry date, public key, digital signature to be provided by the CA, etc. With CA-specific rules, users apply rules to a specific issuing CA without the ability for users to deviate from those rules. However, many CA administrators and other users desire the ability to issue certificates from a range of CAs and to control the details of the certificate extension values created at the user level. The numbered circles in FIG. 1 illustrate an example process involving a user generating a request 124 to create a certificate issuance policy; a certificate management service 106 processing the request and creating a certificate issuance policy resource (e.g., one or more of certificate issuance policy resources 118A, 118B, . . . , 118N) to be applied by a certificate issuance rules engine 120 as part of global registration authority services 122 provided by the certificate management service 106; a user or resource generating a certificate issuance request 126; the certificate issuance rules engine 120 (which is separate from a plurality of CA services with which the rules engine is integrated) applying one or more certificate issuance rules applicable to the request, possibly including modifying the request (e.g., to set certain extension values or to modify other parts of the request); and a CA (e.g., the public CA services 110) generating and returning a requested certificate 114.

At circle "1," a customer, using electronic device 102, sends a request to certificate management service 106 to create a certificate issuance policy. The user, for example, might be responsible for or otherwise desire to configure a set of certificate issuance rules to be applied to a set of users and/or roles (e.g., users or roles defined as part of an organization). As indicated, the ability for a user to define certificate issuance policy that can be applied globally across a collection of users, across different CAs, and across different certificate types, thereby significantly decreasing the burden of managing certificate issuance within organizations. In some embodiments, a user can create and configure a certificate issuance policy using an API provided by the certificate management service 106, a web-based console, a CLI, or other interface. For example, a user desiring to configure a certificate issuance policy can login to a web-based console provided by the certificate management service 106 and provide input indicating that the user desires to configure a new set of rules. The web-based console can then provide a guided set of interfaces and interface elements requesting input used to define the policy. As shown, a certificate issuance request 126 can alternatively originate from a customer service 128, a control plane of another provider network 100 service, or any other service or resource requesting the issuance of certificate.

In some embodiments, the definition of a certificate issuance policy can include, among other information, a user or set of users and/or roles to which the policy is to be applied (or to which individual rules comprising a policy are to be applied). In some embodiments, the selected users or roles to which a policy or rule is to be applied can be selected based on selection of user accounts, roles, user groups, organizations, or other groupings of users or roles, where such user accounts, roles, user groups, and organizations can be defined using an identity and access management service provided by the cloud provider network 100 or using an identity and access management system controlled by the organization configuring the policy.

In some embodiments, the definition of a certificate issuance rule can include a rule statement. As one example, a rule statement can specify one or more domains and further specify whether the one or more users or roles to which the rule applies are permitted or denied from issuing certificates for the specified domains. As another example, a rule statement can specify whether users are allowed to use wildcards or not as part of a domain specified in a request. As yet another example, a rule statement can specify whether it is applicable to public certificates, private certificates, or both. Rule statements can also specify requirements for other parameters of certain certificate issuance requests such as a key type, a key size, a validity period, a validation type (e.g., DNS or email validation), etc. Other example rules include a limit on a number of certificates that a user can issue, or a rate at which certificates are requested. The rule statements configured as part of a certificate issuance policy can be configured incrementally and updated over time, as described in more detail herein.

As one illustrative example, a CA administrator might configure a rule to be applied to requests associated with a user A when requesting public or private certificates. In this example, the rule might specify that user A can issue certificates only for the subject name "*.usera.example.com" and that the certificates must have a validity period of no more than 30 days. As another example, a rule can be applied to an entire development team of users requiring that any certificate issued by a user of the development teams includes a particular tag. As yet another example, a rule configured to apply to all users within an organization might be specified requiring that any public certificate issuance requests must use a specific domain validation method. A rule can be configured to apply to only one or more specified CAs, can specify a template to be used for requests matching the rule, among many other possibilities.

At circle "2," the certificate management service 106 processes the request. In some embodiments, the certificate management service 106 creates a certificate issuance policy resource or adds the rule to an existing certificate issuance policy resource (e.g., one of certificate issuance policy resources 118A, 118B, . . . , 118N). The certificate issuance policy resources can, for example, be stored as text documents or other data structures containing a structured representation (e.g., JSON-formatted) of the rules contained in the policy. For example, each policy and/or rule can be specified and stored in a structured representation identifying one or more users or roles to which the policy or rule applies, request context information indicating types of requests to which the policy or rule applies, and action information indicating a type of action the certificate issuance rules engine 120 is to perform responsive to identifying a request matching a policy or rule.

At circle "3," a certificate issuance request 126 is generated and sent to the certificate management service 106. In some embodiments, the request is associated with a request context including at least an identifier of a user account or role associated with the request, and a plurality of parameters related to the requested certificate (e.g., a subject name, a type of certificate, a validity period, a key type, etc.). The request context can also include a wide range of other information including, but not limited to, an IP address associated with the request, a time at which the request is generated, a number of requests from a same user account or role in a preceding time period, a type of principal associated with the request (e.g., a user or a role), and the like.

At circle "4," the certificate issuance rules engine 120 receives the request and determines whether one or more certificate issuance policies apply to the request. For example, the certificate issuance rules engine 120 can determine whether any policy applies to the user account or role associated with the request and further determine whether and certificate issuance rules contained in a policy match any request context (e.g., if a rule applies to certificate issuance request for public certificates associated with a specified domain name, the rules engine 120 can determine whether the request is for a public certificate for the specified domain name). As shown, the certificate issuance rules engine 120 is separate from a plurality of CA services (e.g., the public CA services 110 and private CA services 112, among possibly others) with which the rules engine is integrated.

In the example of FIG. 1, the certificate issuance rules engine 120 determines that at least one policy and associated rule applies to the certificate issuance request 126. At circle "5," the certificate issuance rules engine 120 thus, this example, modifies at least one of the plurality of parameters related to the requested certificate to obtain a modified request to generate a certificate. For example, if the request 126 is for a public certificate with a validity period of six months, and a rule applicable to the request restricts public certificates requested by the particular user to a maximum of three months, the certificate issuance request can be modified to change the requested validity period (e.g., possibly by modifying a certificate signing request (CSR) associated with the request). As another example, the certificate issuance rules engine 120 might modify a key type or any other parameter associated with the request based on one or more applicable rules. The example of FIG. 1 illustrates the modification of a certificate issuance request by the certificate issuance rules engine 120; in other examples described herein, requests can also be denied or otherwise processed differently based on one or more applicable rules.

At circle "6," the public CA services 110 generates and returns the certificate 114 based on the modified request. In some embodiments, the certificate is returned to the requesting device 102 or, in other examples, can be automatically installed within one or more integrated services of the provider network 100 depending on the user request. Although the example shown in FIG. 1 illustrates the interposition of a certificate issuance rules engine 120 between requesting devices and various types of CAs within a provider network 100, in other examples, a certificate issuance rules engine can also be used to control certificate issuance requests directed to external CAs or other certificate-related services.

The example illustrated in FIG. 1 involves the use of a certificate issuance rules engine 120 and configured certificate issuance policies to control the issuance of certificates across, e.g., public CA services, private CA services, and the like. In other examples, the certificate issuance rules engine 120 can more broadly be used to manage the creation of and constrain the use of private CAs within a user's organization, document signing solutions, and any other types of certificate-related services that may be present within an organization's PKI.

Figure 2:
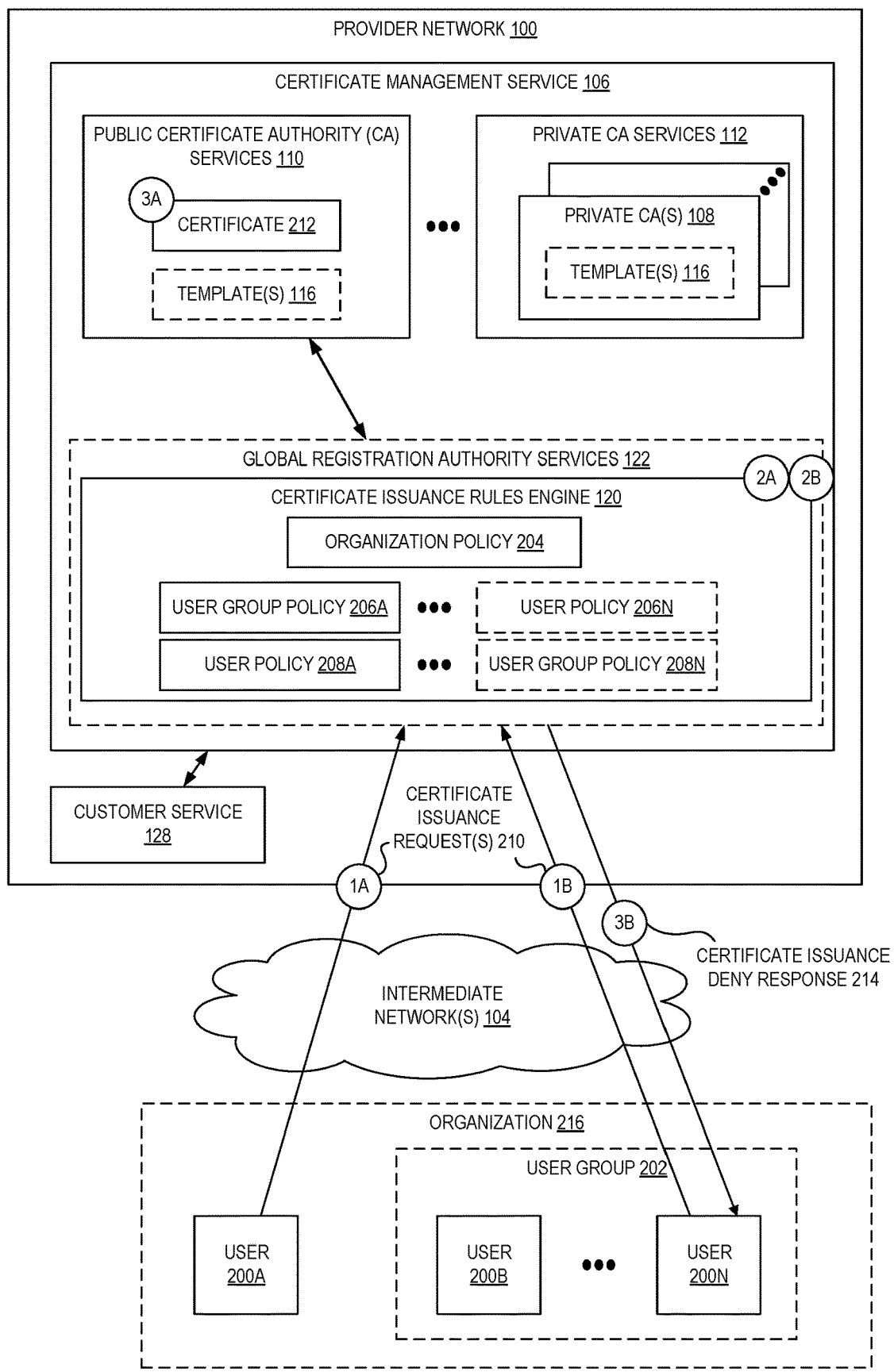
FIG. 2 is a diagram illustrating the application of certificate issuance policies responsive to requests for certificates from various users or resources according to some embodiments.

FIG. 2 is a diagram illustrating the application of certificate issuance policy resources to multiple users within an organization and optionally using a hierarchical applications of multiple certificate issuance policy resources to users according to some embodiments. As shown in FIG. 2, for example, a group of users 200A, 200B, . . . 200N that are part of an organization 216 may be grouped into one or more user groups 202. Furthermore, a CA administrator or other user has configured an organization policy 204 (e.g., including rules to be applied to all users in the organization 216), one or more user group policies 206A, . . . , 206N, and one or more user policies 208A, . . . , 208N.

In this example, at circle "1A," a user 200A uses an electronic device to generate a certificate issuance request 210 requesting the issuance of a public certificate 212 using public CA services 110. The certificate issuance rules engine 120A, at circle "2A," determines whether one or more policies and/or rules applies to the request based at least in part on the request context (e.g., an identity of the user 200A, a role used for the request, parameters related to the requested certificate, etc.). In this example, an organization policy 204 might apply to the request in addition to a user policy 208A that is specific to the user 200A, where one rule indicates that the request is permitted and a second rule indicates that a particular domain validation method is to be used. The certificate issuance rules engine 120 thus may generate a modified request to the public CA services 110 resulting, at circle "3A," in the issuance of a certificate 212.

Similarly, a different user 200N generates, at circle "1B," a second certificate issuance request 210, possibly including different request parameters. For example, the second certificate issuance request 210 might request a certificate from a private CA 108. In the example of FIG. 2, the certificate issuance rules engine 120 determines that at least one policy and/or rule applies to the second request and determines that the request is not permitted. The certificate issuance rules engine 120 thus sends a certificate issuance deny response 214 to the requesting user device to alert the user that the certificate issuance request was not permitted. As illustrated, the application of certificate issuance policies and rules can thus be applied in a hierarchical fashion depending on an organization's division into user groups, etc. In some embodiments, responses can be returned to requesting devices in cases where the certificate issuance rules engine 120 modifies a certificate issuance requested based on the application of one or more certificate issuance rules, e.g., to inform the user that the request is being satisfied but that certain parameters may have changed.

Figure 3:
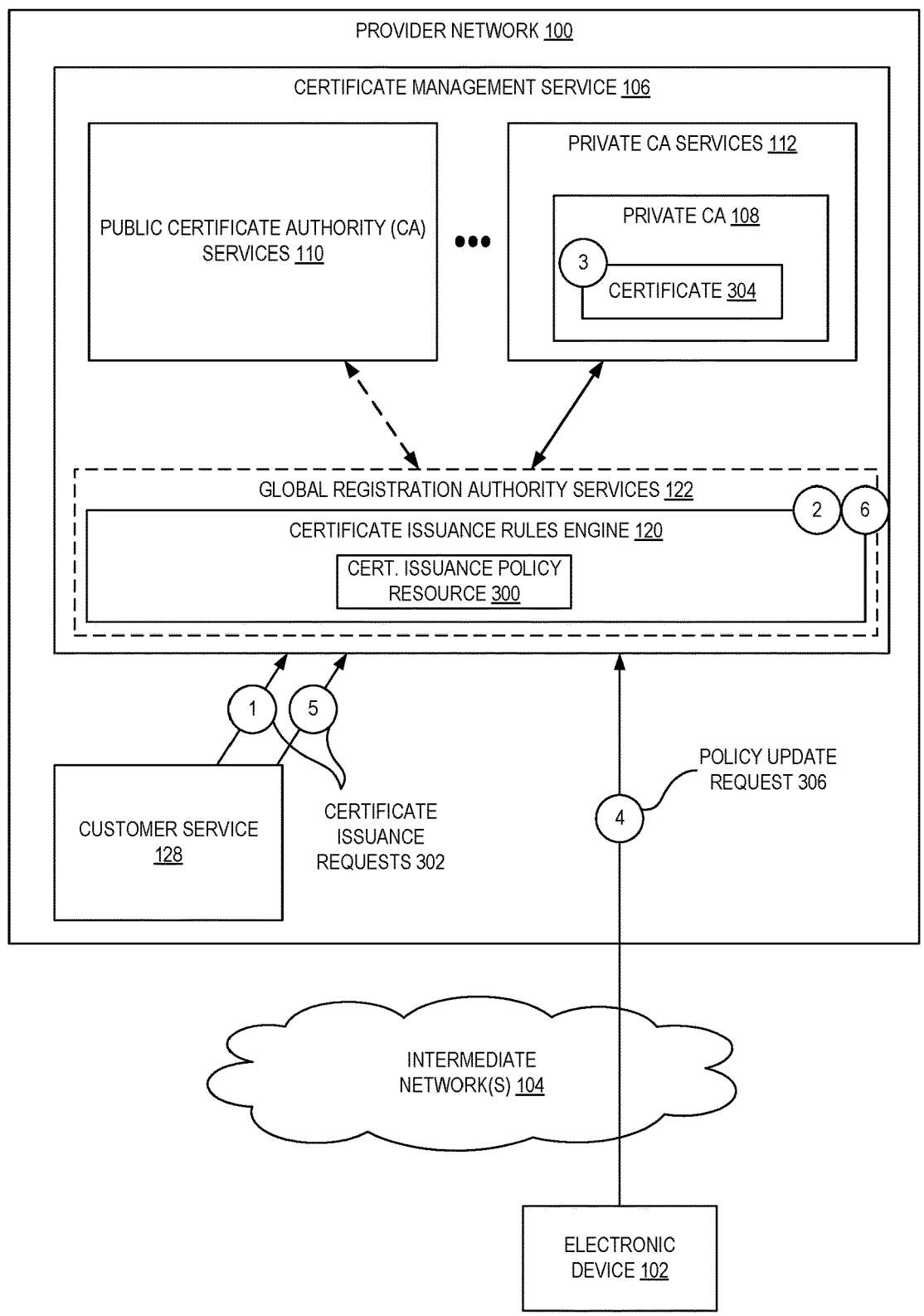
FIG. 3 is a diagram illustrating the dynamic configuration of a certificate issuance policy according to some embodiments.

FIG. 3 is a diagram illustrating the dynamic configuration of certificate issuance policies resources and associated certificate issuance policy rules according to some embodiments. For example, at circle "1" in FIG. 3, a user uses a computing device 102 to configure a certificate issuance policy resource 300 to be applied to requests associated with any of a plurality of accounts or roles. The example certificate issuance policy resource 300 is initially configured with a rule, for example, permitting the users to request the issuance of certificates to be used to secure any subject name "*.example.com". For example, at circle "2," a certificate issuance request 302 is generated requesting the generation of a certificate matching the wildcard subject name and, according to the current rule, the request is successfully processed and, at circle "3," a certificate 304 is returned by the certificate management service 106.

In this example, at some point in time the user that initially configured the certificate issuance policy resource 300 decides to limit the issuance of certificates to only a specific subject name without wildcards (e.g., "dev.example.com"). The user thus, at circle "4," uses a web-based console, API, CLI, or other interface to generate a policy update request 306 to modify the applicable policy/rule as desired. At a later point in time, at circle "5," a second certificate issuance request 302 to which the certificate issuance policy resource 300 applies and, at circle "6," the certificate issuance rules engine 120 denies the request and the requested certificate is not generated or returned. As illustrated, the certificate issuance rules engine 120 thus enables the creation of dynamic certificate issuance rules that can be changed over time as needed by an organization.

Figure 4:
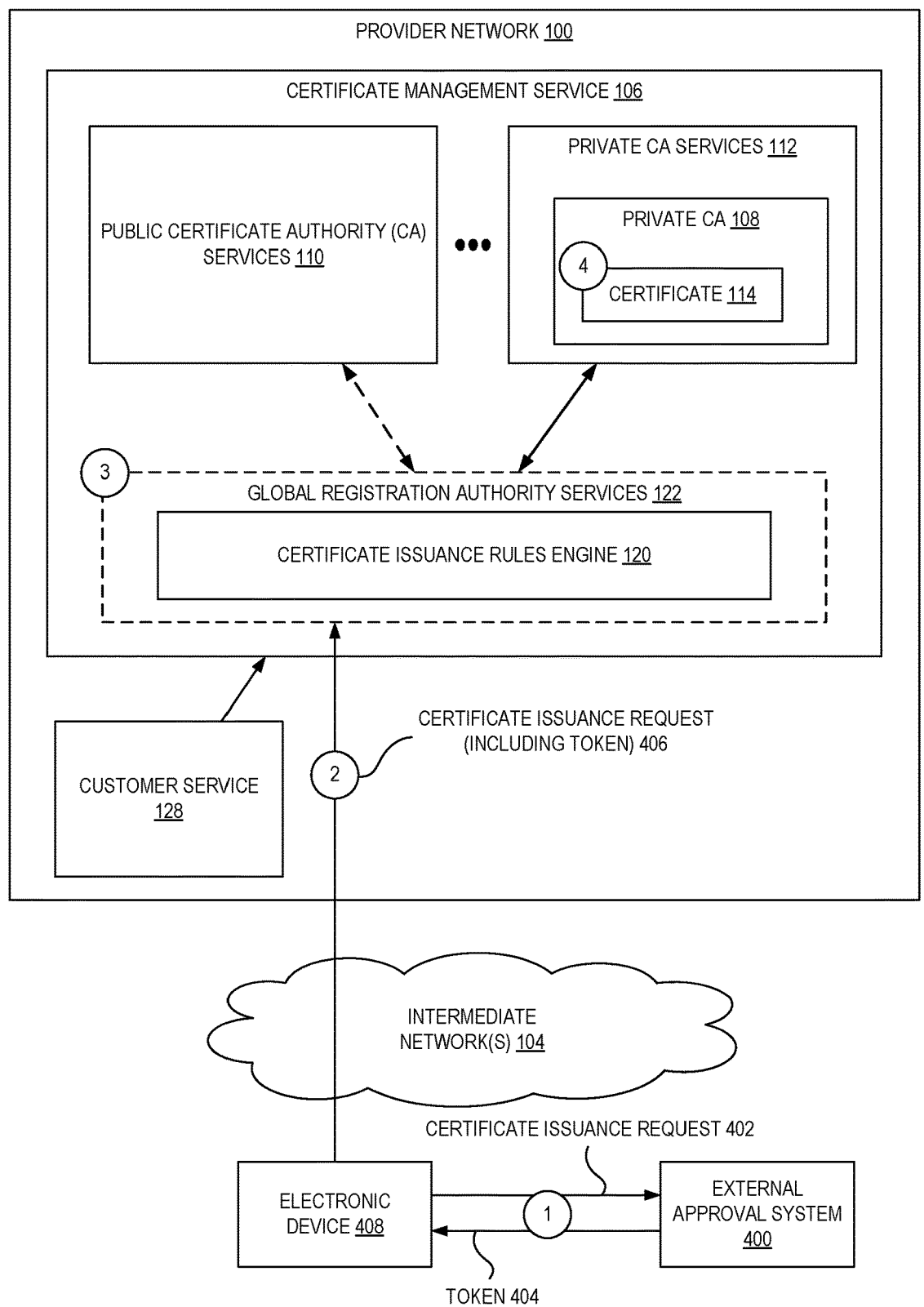
FIG. 4 is a diagram illustrating the use of a custom certificate issuance pre-approval process and the validation of a custom pre-approval process by a certificate management service according to a certificate issuance policy according to some embodiments.

FIG. 4 is a diagram illustrating the ability for users to provide custom request context in association with certificate issuance requests according to some embodiments. As an example, an organization might have its own approval system 400 for approving user requests for certain types of certificates. In this example, the organization's own approval system 400 can receive and analyze certificate issuance requests (e.g., a certificate issuance request 402) and, if a request is permitted by its own internal policy or procedures, generate a token 404 evidencing the requestor's permission to obtain the certificate. In other examples, users can obtain data from a Lightweight Directory Access Protocol (LDAP) system or other internal authentication system and provide the data as part of certificate issuance requests for use in conjunction with one or more configured certificate issuance policies. As shown in FIG. 4, such a token 404 can be provided as part of the request context of a certificate issuance request (e.g., a certificate issuance request 406) and, at circle "3," validated by the certificate management service 106 before the requested certificate is generated and returned by an applicable CA.

For example, at circle "1" in FIG. 4, a device 408 sends, to an organization's certificate issuance approval system 400, a request for a certificate (e.g., where the request can identify a subject name, certificate type, etc.). The certificate issuance approval system 400 receives the request and determines whether the request is permitted based on its own internal rules and procedures. For example, the certificate issuance approval system 400 might determine whether the certificate issuance request is permitted based on an identity of the user, a subject name identified by the request, or based on other parameters or combinations thereof. Responsive to the certificate issuance approval system 400 determining that the request is permitted, the system returns a token 404 to the requesting device 408.

At circle "2," the device 400 then sends a certificate issuance request to the certificate management service 106, where the request includes the token. At circle "3," the rules engine 120 or other component determines that a certificate issuance policy resource applies to the request and processes the request accordingly. In this example, processing the request includes validating the token (e.g., by analyzing the token directly, invoking a serverless function to validate the token, etc.). At circle "4," responsive to the rules engine 120 determining that that the token is valid, the rules engine 120 sends the request to a CA for generation of the certificate. In other examples, responsive to the rules engine 120 determining that a provided token is invalid or expired, then the rules engine 120 denies the request and returns a response indicating that the request was denied.

Figure 5:
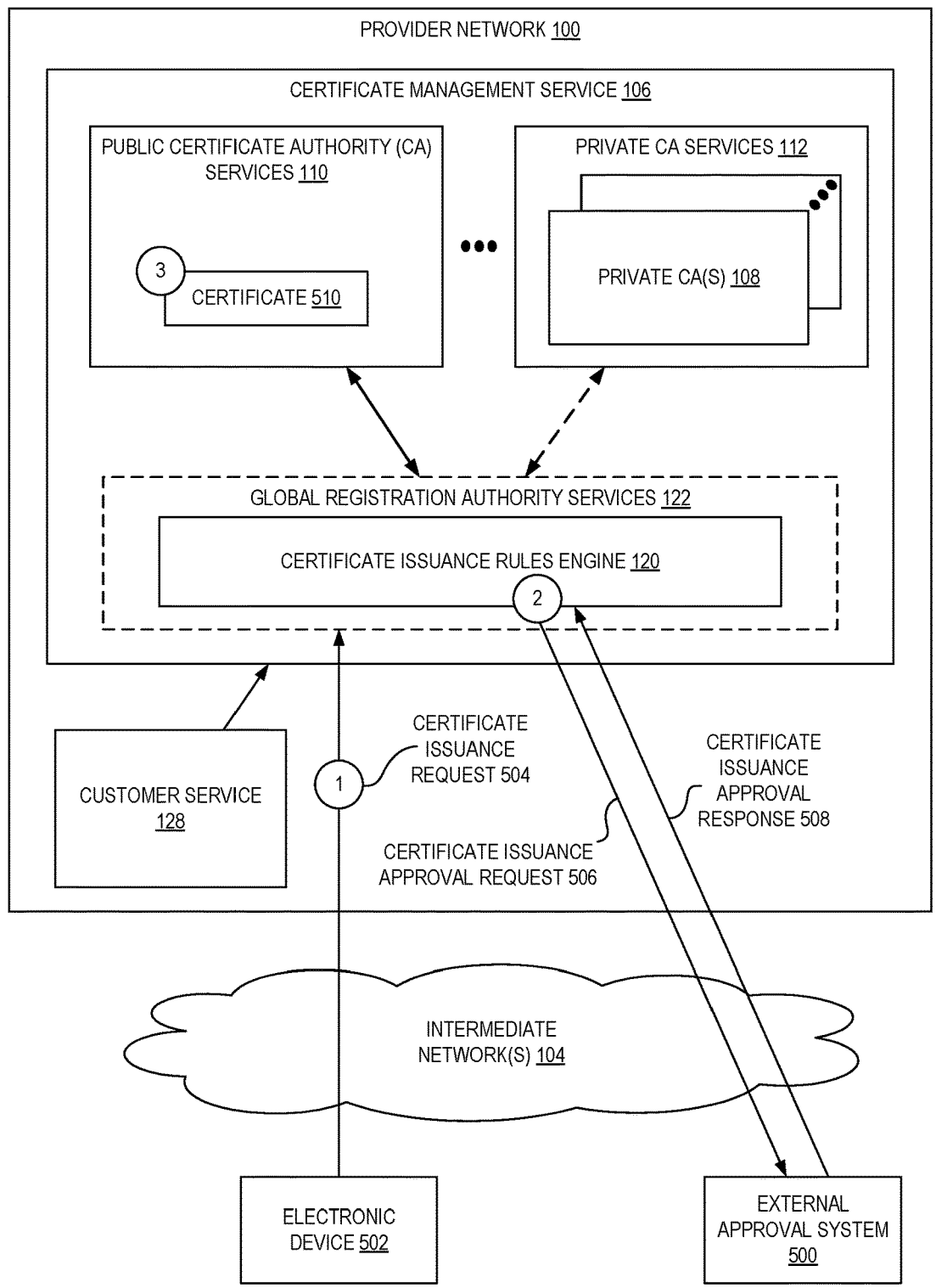
FIG. 5 is a diagram illustrating the use of a hook into a custom certificate issuance approval process by a certificate management service responsive to certificate issuance requests according to some embodiments.

FIG. 5 is a diagram illustrating the ability for users to configure a certificate issuance policy to invoke an external certificate issuance approval workflow according to some embodiments. In FIG. 4, an organization used an external certificate issuance approval system to validate certificate issuance requests and to provide data that can be used as custom request context in a certificate issuance request sent to the certificate management service 106. In the example of FIG. 5, a certificate issuance policy resource is instead configured to invoke a "hook" into an external certificate issuance approval system 500 as part of processing requests by a certificate issuance rules engine 120.

For example, consider an organization that desires for its users to be able to export a public certificate only if the certificate issuance is approved by a particular person in the organization. In this example, the certificate issuance rules engine 120 can "hook" into the external approval system 500 any time a public certificate issuance request is made by an applicable user. The external approval system 500 can then generate an email, an alert in a web console, trigger a ticketing system, or otherwise cause the particular person to either approve or deny the request, where a response is then sent back to the certificate issuance rules engine 120 for further processing.

For example, as shown in FIG. 5, at circle "1," a computing device 502 sends a certificate issuance request 504 to the certificate management service 106. At circle "2," the rules engine 120 receives the request and identifies a certificate issuance policy resource that applies to the request (e.g., based on request context including a user account or role associated with the request). In this example, the identified certificate issuance policy includes a rule indicating that requests to which the rule applies cause the rules engine 120 to invoke an external certificate issuance approval system 500.

In some embodiments, the certificate issuance rules engine 120 can then send a certificate issuance approval request 506 to the external approval system 500 and, depending on whether the internal approval processes determine that the request is permissible or not, return a corresponding certificate issuance approval response 508 (or denial response in other examples). Once the approval is received by the certificate issuance rules engine 120 from the external approval system 500, the rules engine can then cause the appropriate CA to generate and issue the requested certificate (e.g., the certificate 510 at circle "3").

Figure 6:
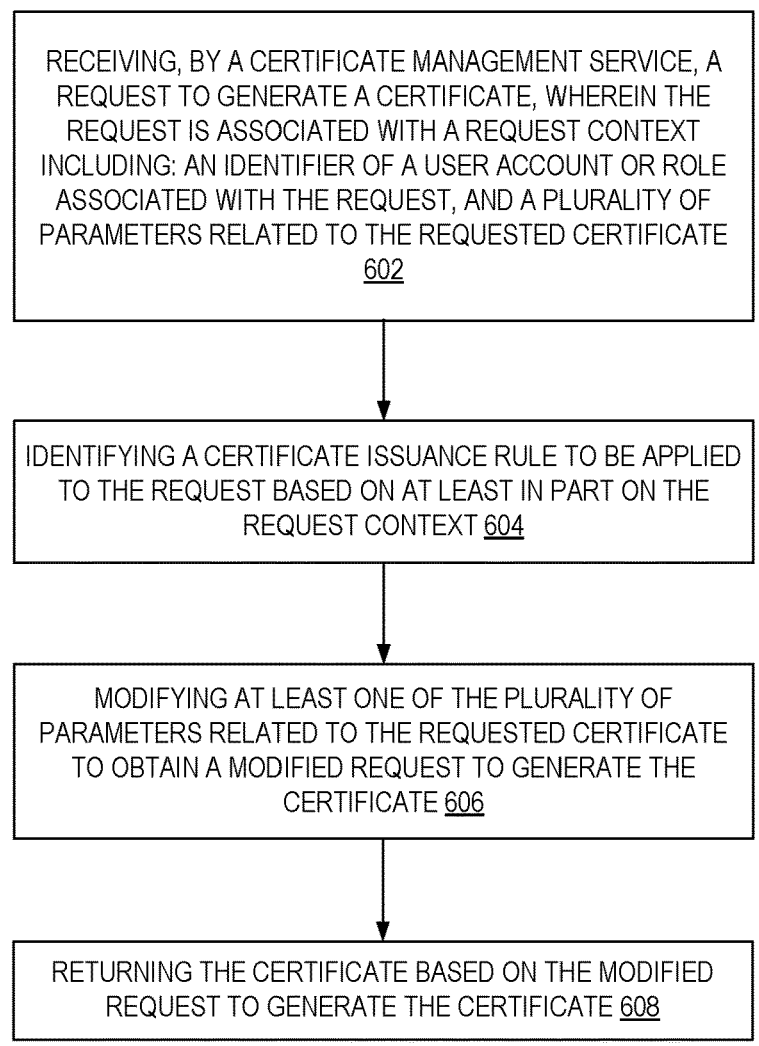
FIG. 6 is a flow diagram illustrating operations of a method for configuring a certificate issuance policy using a certificate management service and using a configured certificate issuance policy to control certificate issuance requests according to some embodiments.

FIG. 6 is a flow diagram illustrating operations 600 of a method for enabling users to configure and use certificate issuance policies according to some embodiments. Some or all of the operations 600 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 600 are performed by a certificate management service 106, etc. of the other figures.

The operations 600 include, at block 602, receiving, by a certificate management service, a request to generate a certificate, wherein the request is associated with a request context including: an identifier of a user account or role associated with the request, and a plurality of parameters related to the requested certificate.

The operations 600 further include, at block 604, identifying a certificate issuance rule to be applied to the request based on at least in part on the request context.

The operations 600 further include, at block 606, modifying at least one of the plurality of parameters related to the requested certificate to obtain a modified request to generate the certificate.

The operations 600 further include, at block 608, returning the certificate based on the modified request to generate the certificate.

In some embodiments, the certificate issuance rule is a first certificate issuance rule of a certificate issuance policy further including a second certificate issuance rule, wherein the certificate management service provides both public certificate authority (CA) services and private CA services, wherein the second request is a request to generate a public certificate, and wherein the operations further include: receiving a third request for a private CA to generate a private certificate; determining that the certificate issuance policy includes the second certificate issuance rule that denies generation of the private certificate based on a request context associated with the third request; and sending a response indicating that the third request was denied.

In some embodiments, the action to be performed includes at least one of: permitting a request, denying a request, using a specified template, or modifying at least one parameter of a request; and application of the certificate issuance rule is based on at least one of: the user account or role associated with the request, a user group of which the user account or role is a member, a domain name specified in the second request, whether a domain name wildcard is used, a requested certificate validity period, a requested cryptographic key type, a requested cryptographic key size, or a certificate tag, one or more fields to be completed by the certificate issuance rule, a rate at which the user account or role is requesting certificates, a volume of certificates requested by the user account or role, or a time of day.

In some embodiments, the certificate issuance rule is configured to apply to certificate issuance requests from a user group including a plurality of user accounts or roles including the user account or role.

In some embodiments, the certificate issuance policy is a first certificate issuance policy, the first certificate issuance policy applies to a user group including the user account or role, a second certificate issuance policy resource further applies to the request, and the second certificate issuance policy applies to the user account.

In some embodiments, the request to generate a certificate is a first request to generate a certificate, and the operations further include: receiving, by the certificate management service, a request to modify the certificate issuance rule; storing a modified certificate issuance rule based on the request; receiving a second request to generate a certificate; and applying the modified certificate issuance rule to the second request.

In some embodiments, the request to generate a certificate is a first request to generate a certificate, the request context is first request context, the certificate issuance rule is a first certificate issuance rule, and the operations further include: receiving, by the certificate management service, a second request to generate a certificate, wherein the second request is associated with a second request context; identifying a second certificate issuance rule to be applied to the second request based on at least part on the second request context; denying the second request based on the second certificate issuance rule; and sending a response indicating that the second request was denied.

In some embodiments, the request context further includes a token generated by an external certificate issuance approval system, and wherein the method further comprises validating the token.

In some embodiments, the operations further include sending, to an external certificate issuance approval system, a request to approve the request to generate the certificate, wherein the request to approve includes at least part of the request context; and receiving a response approving the request to generate the certificate.

Figure 7:
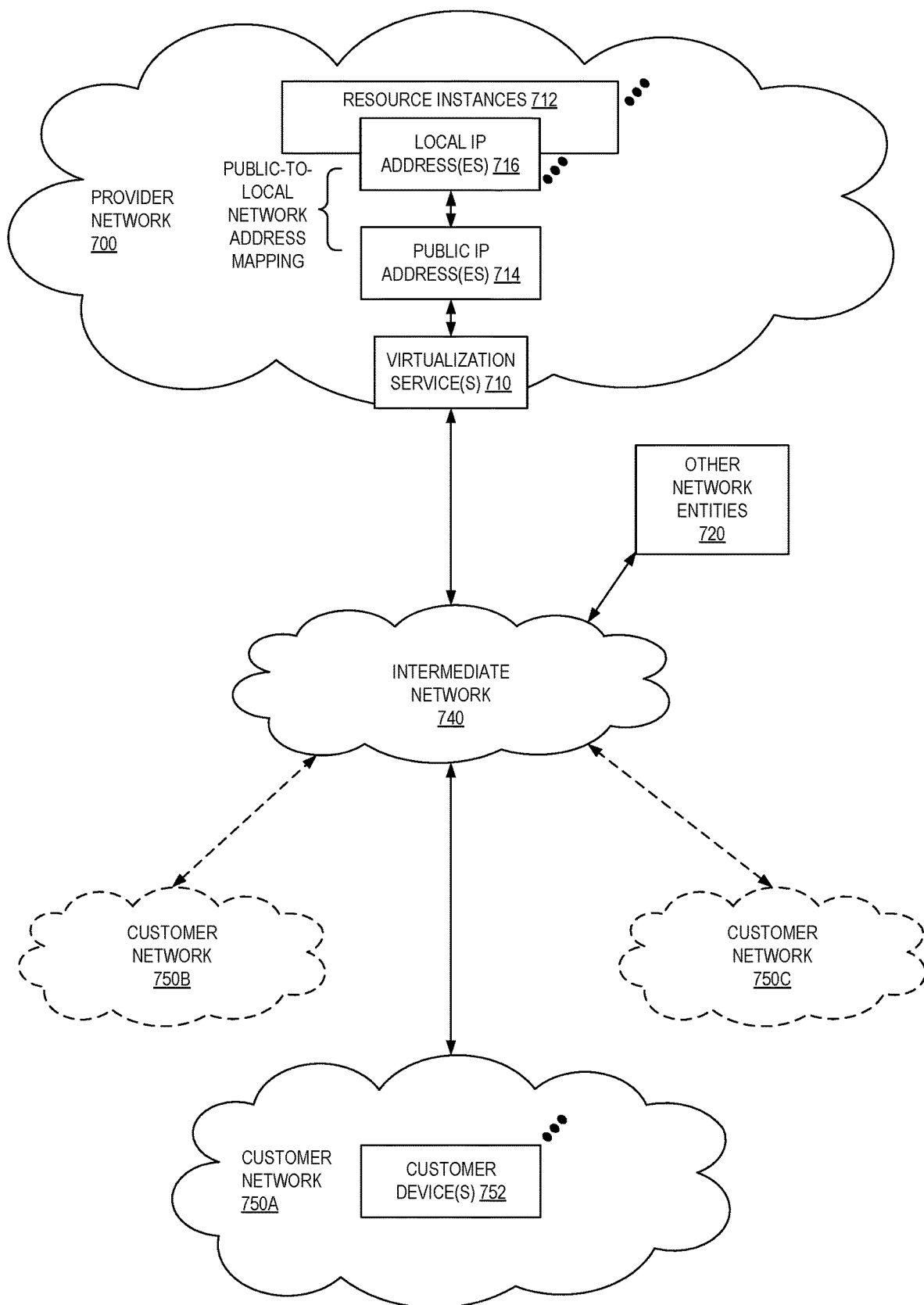
FIG. 7 illustrates an example provider network environment according to some embodiments.

FIG. 7 illustrates an example provider network (or "service provider system") environment according to some embodiments. A provider network 700 can provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 can be associated with the resource instances 712; the local IP addresses are the internal network addresses of the resource instances 712 on the provider network 700. In some embodiments, the provider network 700 can also provide public IP addresses 714 and/or public IP address ranges (e.g., Internet Protocol version 4 (IPv4) or Internet Protocol version 6 (IPv6) addresses) that customers can obtain from the provider 700.

Conventionally, the provider network 700, via the virtualization services 710, can allow a customer of the service provider (e.g., a customer that operates one or more customer networks 750A-750C (or "client networks") including one or more customer device(s) 752) to dynamically associate at least some public IP addresses 714 assigned or allocated to the customer with particular resource instances 712 assigned to the customer. The provider network 700 can also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of the customer network(s) 750A-750C can, for example, implement customer-specific applications and present the customer's applications on an intermediate network 740, such as the Internet. Other network entities 720 on the intermediate network 740) can then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 can be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some embodiments, the mapping of a standard IP address to a local IP address of a resource instance is the default launch configuration for all resource instance types.

At least some public IP addresses can be allocated to or obtained by customers of the provider network 700; a customer can then assign their allocated public IP addresses to particular resource instances allocated to the customer. These public IP addresses can be referred to as customer public IP addresses, or simply customer IP addresses. Instead of being assigned by the provider network 700 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
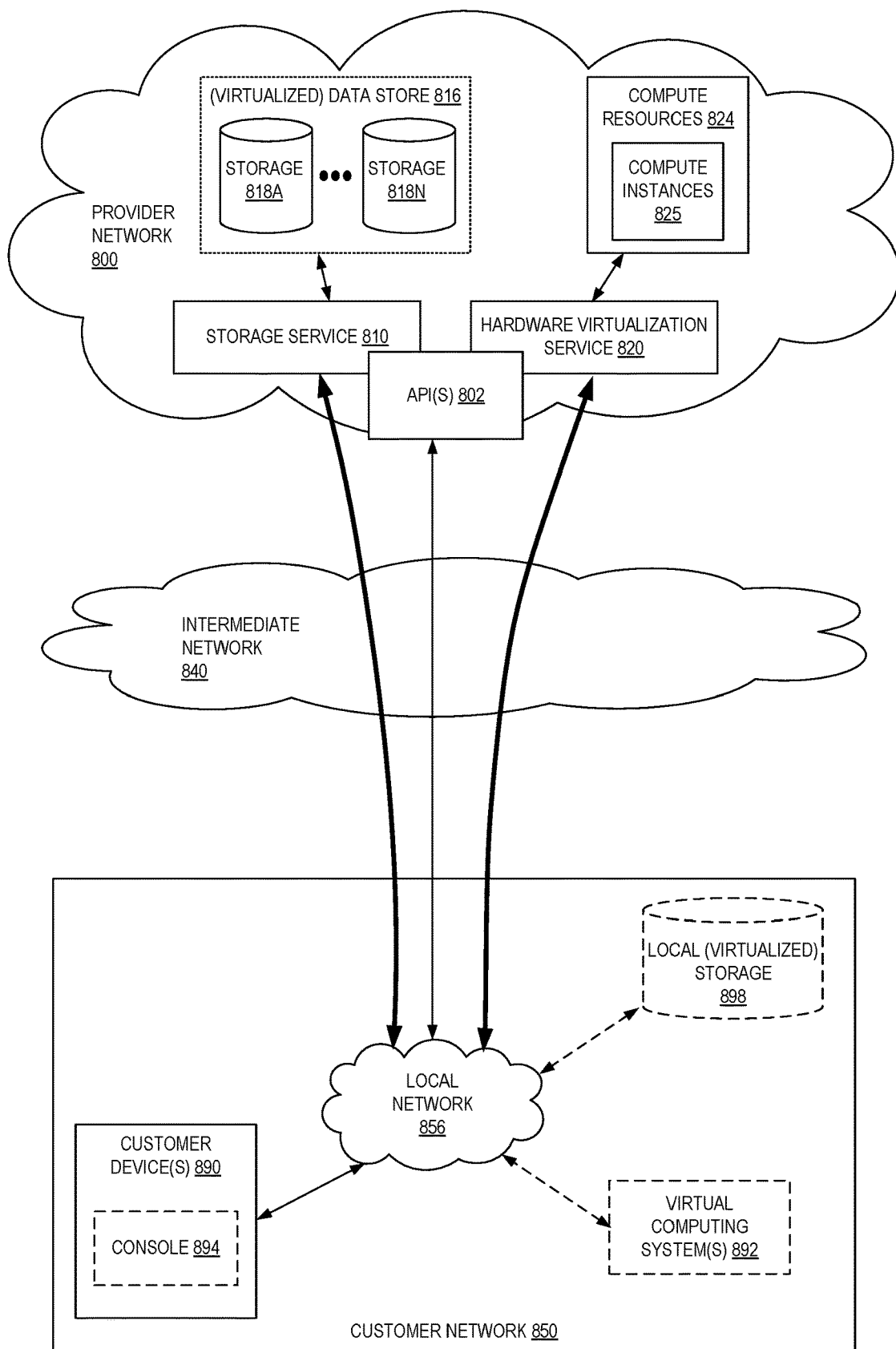
FIG. 8 is a block diagram of an example provider network that provides a storage service and a hardware virtualization service to customers according to some embodiments.

FIG. 8 is a block diagram of an example provider network environment that provides a storage service and a hardware virtualization service to customers, according to some embodiments. A hardware virtualization service 820 provides multiple compute resources 824 (e.g., compute instances 825, such as VMs) to customers. The compute resources 824 can, for example, be provided as a service to customers of a provider network 800 (e.g., to a customer that implements a customer network 850). Each computation resource 824 can be provided with one or more local IP addresses. The provider network 800 can be configured to route packets from the local IP addresses of the compute resources 824 to public Internet destinations, and from public Internet sources to the local IP addresses of the compute resources 824.

The provider network 800 can provide the customer network 850, for example coupled to an intermediate network 840 via a local network 856, the ability to implement virtual computing systems 892 via the hardware virtualization service 820 coupled to the intermediate network 840 and to the provider network 800. In some embodiments, the hardware virtualization service 820 can provide one or more APIs 802, for example a web services interface, via which the customer network 850 can access functionality provided by the hardware virtualization service 820, for example via a console 894 (e.g., a web-based application, standalone application, mobile application, etc.) of a customer device 890. In some embodiments, at the provider network 800, each virtual computing system 892 at the customer network 850 can correspond to a computation resource 824 that is leased, rented, or otherwise provided to the customer network 850.

From an instance of the virtual computing system(s) 892 and/or another customer device 890 (e.g., via console 894), the customer can access the functionality of a storage service 810, for example via the one or more APIs 802, to access data from and store data to storage resources 818A-818N of a virtual data store 816 (e.g., a folder or "bucket," a virtualized volume, a database, etc.) provided by the provider network 800. In some embodiments, a virtualized data store gateway (not shown) can be provided at the customer network 850 that can locally cache at least some data, for example frequently accessed or critical data, and that can communicate with the storage service 810 via one or more communications channels to upload new or modified data from a local cache so that the primary store of data (the virtualized data store 816) is maintained. In some embodiments, a user, via the virtual computing system 892 and/or another customer device 890, can mount and access virtual data store 816 volumes via the storage service 810 acting as a storage virtualization service, and these volumes can appear to the user as local (virtualized) storage 898.

While not shown in FIG. 8, the virtualization service(s) can also be accessed from resource instances within the provider network 800 via the API(s) 802. For example, a customer, appliance service provider, or other entity can access a virtualization service from within a respective virtual network on the provider network 800 via the API(s) 802 to request allocation of one or more resource instances within the virtual network or within another virtual network.

Figure 9:
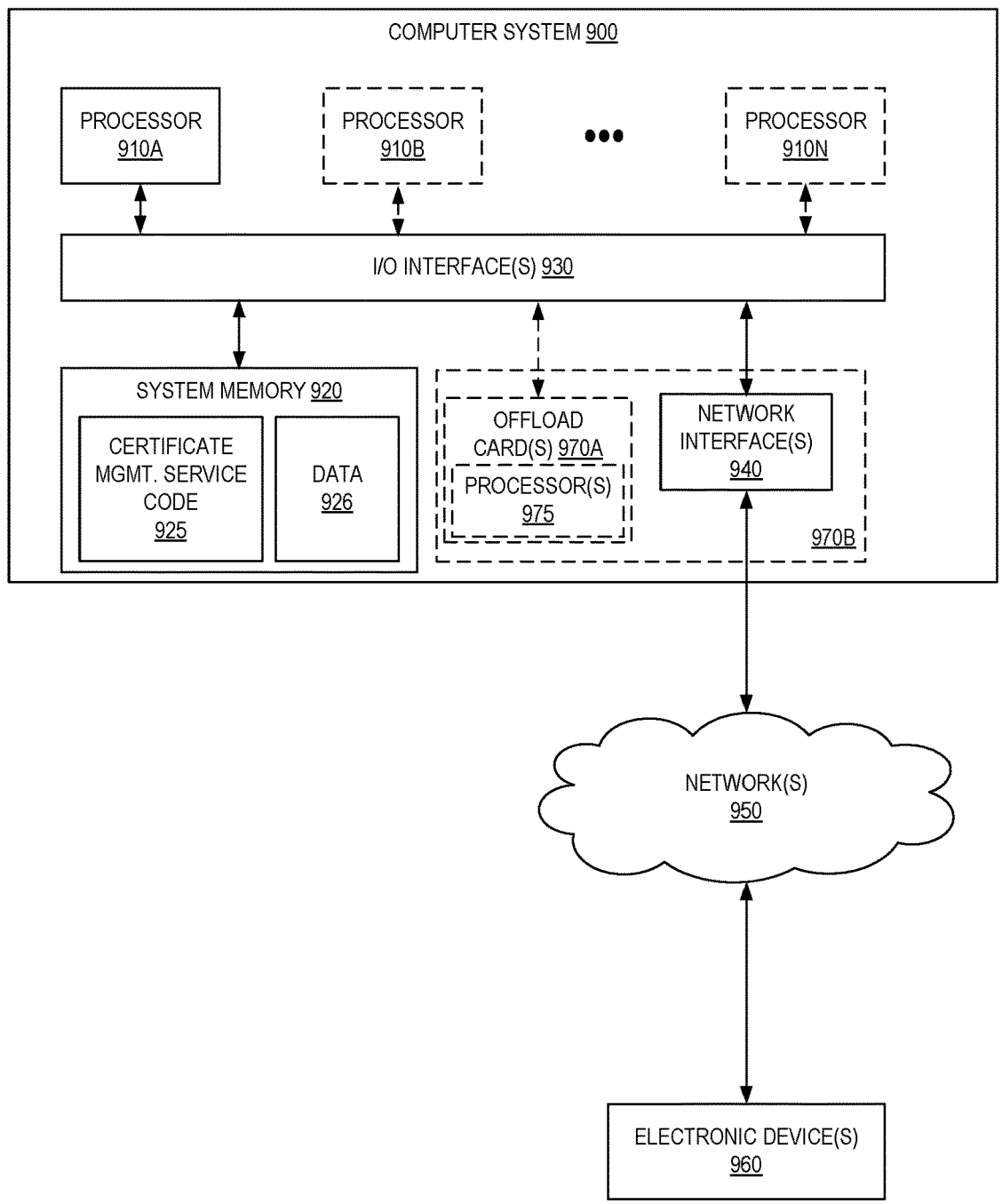
FIG. 9 is a block diagram illustrating an example computer system that can be used in some embodiments.

In some embodiments, a system that implements a portion or all of the techniques described herein can include a general-purpose computer system, such as the computer system 900 illustrated in FIG. 9, that includes, or is configured to access, one or more computer-accessible media. In the illustrated embodiment, the computer system 900 includes one or more processors 910 coupled to a system memory 920 via an input/output (I/O) interface 930. The computer system 900 further includes a network interface 940 coupled to the I/O interface 930. While FIG. 9 shows the computer system 900 as a single computing device, in various embodiments the computer system 900 can include one computing device or any number of computing devices configured to work together as a single computer system 900.

In various embodiments, the computer system 900 can be a uniprocessor system including one processor 910, or a multiprocessor system including several processors 910 (e.g., two, four, eight, or another suitable number). The processor(s) 910 can be any suitable processor(s) capable of executing instructions. For example, in various embodiments, the processor(s) 910 can be general-purpose or embedded processors implementing any of a variety of instruction set architectures (ISAs), such as the x86, ARM, PowerPC, SPARC, or MIPS ISAS, or any other suitable ISA. In multiprocessor systems, each of the processors 910 can commonly, but not necessarily, implement the same ISA.

The system memory 920 can store instructions and data accessible by the processor(s) 910. In various embodiments, the system memory 920 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within the system memory 920 as specialized certificate authority service code 925 (e.g., executable to implement, in whole or in part, the certificate management service 106) and data 926.

In some embodiments, the I/O interface 930 can be configured to coordinate I/O traffic between the processor 910, the system memory 920, and any peripheral devices in the device, including the network interface 940 and/or other peripheral interfaces (not shown). In some embodiments, the I/O interface 930) can perform any necessary protocol, timing, or other data transformations to convert data signals from one component (e.g., the system memory 920) into a format suitable for use by another component (e.g., the processor 910). In some embodiments, the I/O interface 930 can include support for devices attached through various types of peripheral buses, such as a variant of the Peripheral Component Interconnect (PCI) bus standard or the Universal Serial Bus (USB) standard, for example. In some embodiments, the function of the I/O interface 930 can be split into two or more separate components, such as a north bridge and a south bridge, for example. Also, in some embodiments, some or all of the functionality of the I/O interface 930, such as an interface to the system memory 920, can be incorporated directly into the processor 910.

The network interface 940 can be configured to allow data to be exchanged between the computer system 900 and other devices 960 attached to a network or networks 950, such as other computer systems or devices as illustrated in FIG. 1, for example. In various embodiments, the network interface 940) can support communication via any suitable wired or wireless general data networks, such as types of Ethernet network, for example. Additionally, the network interface 940) can support communication via telecommunications/telephony networks, such as analog voice networks or digital fiber communications networks, via storage area networks (SANs), such as Fibre Channel SANs, and/or via any other suitable type of network and/or protocol.

In some embodiments, the computer system 900 includes one or more offload cards 970A or 970B (including one or more processors 975, and possibly including the one or more network interfaces 940) that are connected using the I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 can act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations, such as pausing and/or un-pausing compute instances, launching and/or terminating compute instances, performing memory transfer/copying operations, etc. These management operations can, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and cannot coordinate with (or service) any separate hypervisor.

In some embodiments, the system memory 920 can be one embodiment of a computer-accessible medium configured to store program instructions and data as described above. However, in other embodiments, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 900 via the I/O interface 930. A non-transitory computer-accessible storage medium can also include any volatile or non-volatile media such as RAM (e.g., SDRAM, double data rate (DDR) SDRAM, SRAM, etc.), read only memory (ROM), etc., that can be included in some embodiments of the computer system 900 as the system memory 920 or another type of memory. Further, a computer-accessible medium can include transmission media or signals such as electrical, electromagnetic, or digital signals, conveyed via a communication medium such as a network and/or a wireless link, such as can be implemented via the network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes can be made thereunto without departing from the broader spirit and scope of the disclosure as set forth in the claims.

What is claimed is:

1. A computer-implemented method comprising:
   receiving, by a certificate management service of a cloud provider, a first request to create a certificate issuance policy, wherein the first request indicates:
   one or more user accounts or roles to which the certificate issuance policy is to be applied, and
   a certificate issuance rule including an action to be performed relative to requests matching the certificate issuance rule;
   storing a certificate issuance policy resource including a representation of the certificate issuance rule indicated in the first request;
   receiving a second request to generate a certificate, wherein the second request is associated with a user account or a role, and wherein the second request includes a plurality of parameters related to generation of the certificate requested in the second request;
   determining, by a rules engine of the certificate management service, that the certificate issuance policy applies to the user account or role associated with the second request, wherein the rules engine is separate within the certificate management service from a plurality of certificate authority (CA) services with which the rules engine is integrated via an application programming interface;
   modifying, based on the certificate issuance rule that was indicated in the first request, at least one of the plurality of parameters of the second request to obtain a modified second request;
   generating the certificate based on the modified second request; and
   returning the generated certificate as a response to the second request.

2. The computer-implemented method of claim 1, wherein the certificate issuance rule is a first certificate issuance rule, wherein the certificate management service provides both public certificate authority (CA) services and private CA services, wherein the second request is a request to generate a public certificate, and wherein the method further comprises:

receiving a third request for a private CA to generate a private certificate;

determining that the certificate issuance policy includes a second certificate issuance rule that denies generation of the private certificate based on a request context associated with the third request; and sending a response indicating that the third request was denied.

3. The computer-implemented method of claim 1, wherein the action to be performed includes at least one of: permitting a request, denying a request, using a specified template, or modifying at least one parameter of a request; and wherein application of the certificate issuance rule is based on at least one of: the user account or role associated with the second request, a user group of which the user account or role is a member, a domain name specified in the second request, whether a domain name wildcard is used, a requested certificate validity period, a requested cryptographic key type, a requested cryptographic key size, or a certificate tag, one or more fields to be completed by the certificate issuance rule, a rate at which the user account or role is requesting certificates, a volume of certificates requested by the user account or role, or a time of day.

4. A computer-implemented method comprising:

receiving a first request indicating a certificate issuance rule, the certificate issuance rule comprising an action to be performed relative to requests matching the certificate issuance rule;

receiving, by a public key infrastructure (PKI) service, a second request to generate a certificate, wherein the second request is associated with a request context including: an identifier of a user account or role associated with the second request, and a plurality of parameters related to the requested certificate;

identifying, by a rules engine of the PKI service, that the certificate issuance rule is to be applied to the second request based at least in part on the request context, wherein the rules engine is separate within the PKI service from a plurality of certificate authority (CA) services with which the rules engine is integrated via an application programming interface;

modifying, based on the certificate issuance rule that was indicated in the first request, at least one of the plurality of parameters related to the requested certificate to obtain a modified request to generate the certificate;

generating the certificate based on the modified request to generate the certificate; and returning the generated certificate as a response to the second request.

5. The computer-implemented method of claim 4, wherein the certificate issuance rule is a first certificate issuance rule of a certificate issuance policy further including a second certificate issuance rule, wherein a certificate management service provides both public certificate authority (CA) services and private CA services, wherein the second request is to generate a public certificate, and wherein the method further comprises:

receiving a third request for a private CA to generate a private certificate;

determining that the certificate issuance policy includes the second certificate issuance rule that denies generation of the private certificate based on a request context associated with the third request; and sending a response indicating that the third request was denied.

6. The computer-implemented method of claim 4, wherein an action to be performed based on the certificate issuance rule includes at least one of: permitting a request, denying a request, using a specified template, or modifying at least one parameter of a request; and wherein application of the certificate issuance rule is based on at least one of: the user account or role associated with the second request, a user group of which the user account or role is a member, a domain name specified in the second request, whether a domain name wildcard is used, a requested certificate validity period, a requested cryptographic key type, a requested cryptographic key size, or a certificate tag, one or more fields to be completed by the certificate issuance rule, a rate at which the user account or role is requesting certificates, a volume of certificates requested by the user account or role, or a time of day.

7. The computer-implemented method of claim 4, wherein the certificate issuance rule is configured to apply to certificate issuance requests from a user group including a plurality of user accounts or roles including the user account or role.

8. The computer-implemented method of claim 4, wherein a certificate issuance policy including the certificate issuance rule is a first certificate issuance policy, wherein the first certificate issuance policy applies to a user group including the user account or role, wherein a second certificate issuance policy further applies to the second request, and wherein the second certificate issuance policy applies to the user account.

9. The computer-implemented method of claim 4, wherein the second request is to generate a first certificate, and wherein the method further comprises:

receiving, by the PKI service, a request to modify the certificate issuance rule;

storing a modified certificate issuance rule based on the request to modify the certificate issuance rule;

receiving a third request to generate a second certificate; and applying the modified certificate issuance rule to the third request.

10. The computer-implemented method of claim 4, wherein the second request is to generate a first certificate, the request context is first request context, the certificate issuance rule is a first certificate issuance rule, and wherein the method further comprises:

receiving, by the PKI service, a third request to generate a second certificate, wherein the third request is associated with a second request context;

identifying a second certificate issuance rule to be applied to the third request based at least in part on the second request context;

denying the third request based on the second certificate issuance rule; and sending a response indicating that the third request was denied.

11. The computer-implemented method of claim 4, wherein the request context further includes a token generated by an external certificate issuance approval system, and wherein the method further comprises validating the token.

12. The computer-implemented method of claim 4, further comprising:
sending, to an external certificate issuance approval system, a request to approve the second request to generate the certificate, wherein the request to approve includes at least part of the request context; and
receiving a response approving the second request to generate the certificate.

13. The computer-implemented method of claim 4, wherein the second request is directed to a private certificate authority (CA).

14. A system comprising:
a first one or more electronic devices to implement a certificate management service in a multi-tenant provider network, wherein the certificate management service comprises instructions that upon execution cause the certificate management service to:
receive a first request indicating a certificate issuance rule, the certificate issuance rule comprising an action to be performed relative to requests matching the certificate issuance rule;
receive a second request to generate a certificate, wherein the second request is associated with a request context including: an identifier of a user account or role associated with the request, and a plurality of parameters related to the requested certificate;
identify, by a rules engine of the certificate management service, that the certificate issuance rule is to be applied to the second request based on at least part of the request context, wherein the rules engine is separate within the certificate management service from a plurality of certificate authority (CA) services with which the rules engine is integrated via an application programming interface;
modify, based on the certificate issuance rule that was indicated in the first request, at least one of the plurality of parameters related to the requested certificate to obtain a modified request to generate the certificate;
generate the certificate based on the modified request to generate the certificate; and
return the generated certificate as a response to the second request; and
a second one or more electronic devices to implement a compute service in the multi-tenant provider network, the compute service comprising instructions that upon execution cause the compute service to:
receive the certificate returned by the certificate management service, and
install the certificate received from the certificate management service for use by a compute instance.

15. The system of claim 14, wherein the certificate issuance rule is a first certificate issuance rule of a certificate issuance policy further including a second certificate issuance rule, wherein the certificate management service provides both public certificate authority (CA) services and private CA services, wherein the second request is to generate a public certificate, and wherein the instructions, when executed, further cause the certificate management service to:
receive a third request for a private CA to generate a private certificate;
determine that the certificate issuance policy includes the second certificate issuance rule that denies generation of the private certificate based on a request context associated with the third request; and
send a response indicating that the third request was denied.

16. The system of claim 14, wherein an action to be performed based on the certificate issuance rule includes at least one of: permitting a request, denying a request, using a specified template, or modifying at least one parameter of a request; and
wherein application of the certificate issuance rule is based on at least one of: the user account or role associated with the second request, a user group of which the user account or role is a member, a domain name specified in the second request, whether a domain name wildcard is used, a requested certificate validity period, a requested cryptographic key type, a requested cryptographic key size, or a certificate tag, one or more fields to be completed by the certificate issuance rule, a rate at which the user account or role is requesting certificates, a volume of certificates requested by the user account or role, or a time of day.

17. The system of claim 14, wherein the certificate issuance rule is configured to apply to certificate issuance requests from a user group including a plurality of user accounts or roles including the user account or role.

18. The system of claim 14, wherein a certificate issuance policy including the certificate issuance rule is a first certificate issuance policy, wherein the first certificate issuance policy applies to a user group including the user account or role, wherein a second certificate issuance policy further applies to the second request, and wherein the second certificate issuance policy applies to the user account.

19. The system of claim 14, wherein the second request is to generate a first certificate, and wherein the instructions, when executed, further cause the certificate management service to:
receive, by the certificate management service, a request to modify the certificate issuance rule;
store a modified certificate issuance rule based on the request to modify the certificate issuance rule;
receive a third request to generate a second certificate; and
apply the modified certificate issuance rule to the third request.

20. The system of claim 14, wherein the second request is to generate a first certificate, the request context is first request context, the certificate issuance rule is a first certificate issuance rule, and wherein the instructions, when executed, further cause the certificate management service to:
receive, by the certificate management service, a third request to generate a second certificate, wherein the third request is associated with a second request context;
identify a second certificate issuance rule to be applied to the third request based at least in part on the second request context;
deny the third request based on the second certificate issuance rule; and
send a response indicating that the third request was denied.

* * * * *